United States Patent Office 3,445,621
Patented May 20, 1969

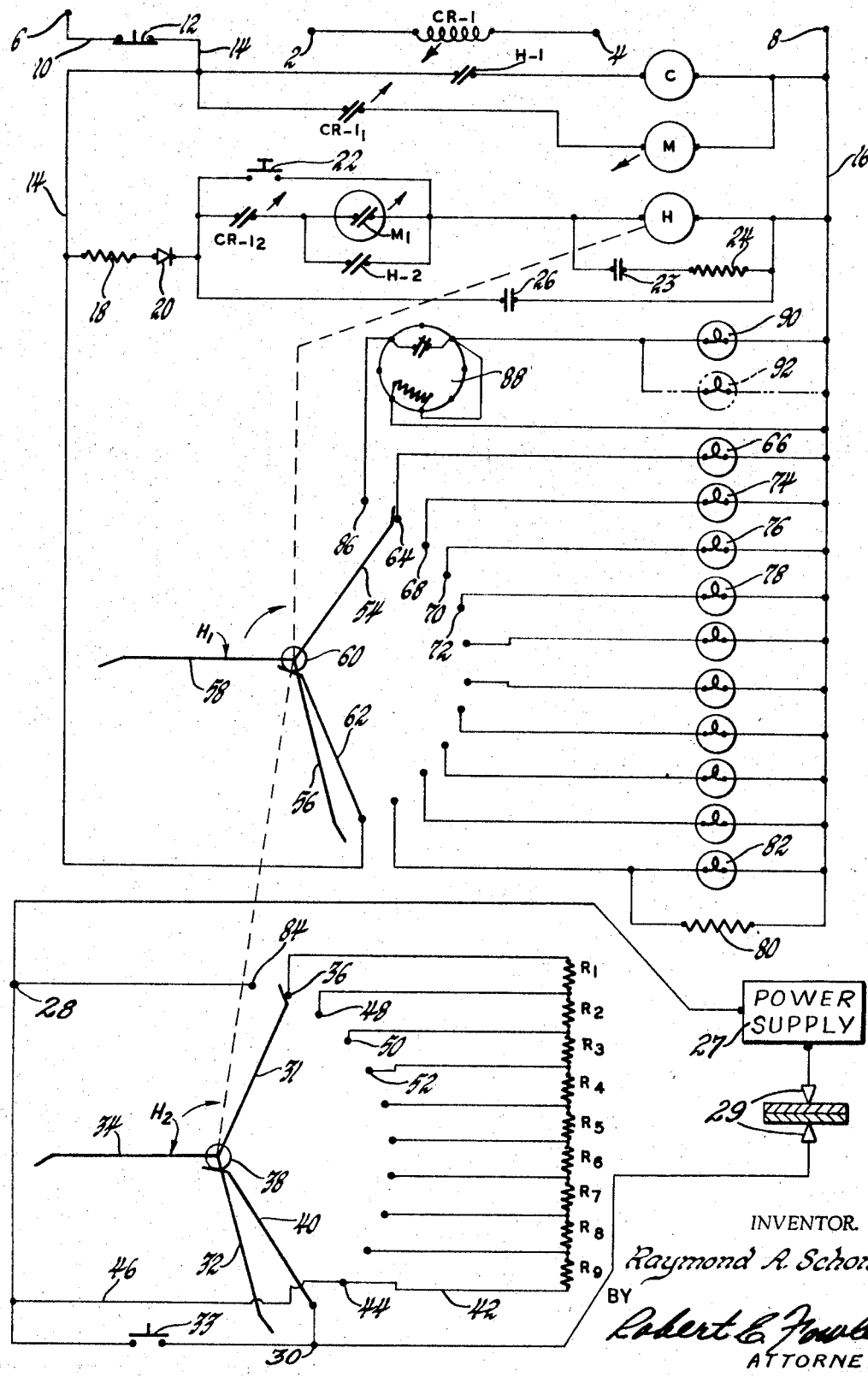

---

3,445,621
STEP RELAY PANEL FOR AUTOMATICALLY INCREASING THE CURRENT FLOW TO A WELDING GUN
Raymond A. Schomer, Royal Oak, Mich., assignor to General Motors Corporation, Detroit, Mich., a corporation of Delaware
Filed Mar. 5, 1964, Ser. No. 349,614
Int. Cl. B23k *11/10, 11/24, 11/30*
U.S. Cl. 219—111                                6 Claims

ABSTRACT OF THE DISCLOSURE

In a spot welding machine control circuit a multi-tap resistor in conjunction with a stepping relay varies the circuit resistance. An impulse counter senses welding pulses and energizes the stepping relay after a set number of pulses to progressively increase the welding current after each series of welds.

---

This invention relates to welding machine control circuits and more particularly to a control circuit for sequentially increasing the welding current delivered to the electrodes of a spot welder over a period of time or use through a predetermined number of work cycles.

In spot welding, welds are made by passing current through workpieces which are held in face-to-face relation in desired position by clamping under pressure between two welding electrodes. The control of the concentration and amount of local heat applied to form the weld nugget is directly related to the form and condition of the ends of the welding electrodes. When starting a particular production run with a spot welder, properly shaped and dressed electrodes are inserted into the electrode holders of the welder and the run is started. After a certain number of welds have been made the ends of the electrodes begin to flatten or mushroom due to both heat and pressure and a larger area of contact exists between the end of the electrodes and the surface of the parts. This will require more welding current to produce the required heat as this area increases and unless the current is increased in proportion to the area the quality of the weld begins to decrease. It has been necessary in the past to either limit the number of spot welds that could be made before the welding electrodes were replaced or some means had to be provided to increase the current as the welder operated in order to provide sufficient heat to continue to produce a satisfactory weld. In order to overcome the problem of increasing area of electrode tips with continued use it is, therefore, suggested that the welding current be automatically increased by providing automatic means for increasing the same which is controlled by the number of welds that have been made from a predetermined starting point.

It is, therefore, an object in making this invention to provide a control means in the power circuit for a spot welder which automatically increases the amount of welding current provided to the electrodes after each series of welds made by the welder in a given work cycle.

It is a further object in making this invention to provide a control circuit which automatically counts the number of welds produced by the welder and then sequentially increases the total amount of current flowing to the electrodes at the end of the production of each given number of welds.

It is a still further object in making this invention to provide a control circuit for a welding machine which counts the number of welds made from an initial starting point and periodically increases the total amount of welding current flowing to the welding electrodes as the number of welds increases.

With these and other objects in view which will become apparent as the specification proceeds, my invention will be best understood by reference to the following specification and claims and the illustrations in the accompanying drawings, in which:

The figure discloses a control circuit for a spot welding machine which automatically counts the welds made and sequentially increases the current incorporating the features of my invention.

The general purpose of the present control system is primarily to count the number of welds made by the welding machine to which it is connected and at the end of each given number of welds periodically cut out or remove a resistance included in the power circuit, thus increasing the total amount of weld current flowing to thus accommodate the increase in electrode area caused by the tips flattening and mushrooming out. My control system, therefore, incorporates a pulse counter which is actuated at the end of a given number of welds to control a stepping relay which advances its operating member to sequentially cut out one resistor at a time which has been incorporated in series with the power circuit to thus increase the amount of current flowing therein.

Referring now more particularly to the drawing there is shown therein a counting relay or motor M which controls a stepping relay actuating coil H to advance a rotary shaft upon which are mounted two series of arms $H_1$ and $H_2$ in the direction of the arrows. This operative connection is indicated by the dashed line connecting the actuating relay coil H with the axes upon which these two sets of arms are mounted. A control relay CR–1 coil is directly connected across the welding circuit has a control impulse applied thereto every time the spot welder fires. The terminals 2 and 4 are connected in an effective part of the welding circuit not shown in detail. This relay includes not only the coil shown at CR–1 but also two sets of contacts CR–$1_1$ and CR–$1_2$ both of which are normally open and are closed upon energization of the relay coil CR–1. Power is supplied for the control circuit through main terminals 6 and 8 which are connected to the conventional 115 to 120 volt A.C. power source. A conductive line 10 is connected to terminal 6 and extends to a manually operable switch 12 which is normally closed but which may be opened if desired by the operator for purposes to be explained. A conductor 14 is connected to the opposite terminal of the manual switch 12 and this conductor is the main power line for the lefthand side of the circuit diagram. The second power line 16 is connected to main input terminal 8 and extends down the righthand side of the diagram shown in the figure.

In series between power lines 14 and 16 there are connected a set of contacts H–1 and a clutch control relay C. When these contacts are closed a clutch is energized to cause the sections $H_1$ and $H_2$ to rotate upon energization of the stepping relay coil H. A second series circuit connected across between the power lines includes previously described contacts CR–$1_1$ which are operated by coil CR–1 in series with the impulse counter M. Thus each time these contacts close, the impulse counter will register one energization or impulse. This, therefore, counts the number of spot welds produced by the machine. Below this circuit on the diagram is the energizing circuit for the step relay coil H. This includes, in series, starting from the power line 14, a limiting resistor 18, a rectifier 20, a first set of control contacts CR–$1_2$, a second set of control contacts $M_1$, and the stepping relay coil H. Thus when both the control relay coil CR–1 and the impulse counter M are energized, the stepping relay will be energized to move one space. A pair of holding contacts H–2 are connected in shunt around the impulse counter contacts $M_1$ so that once the stepping relay coil has initiated a move to the next position it will continue until it has reached the next point. A manual switch 22 is connected in shunt around the contacts CR–1₂ and M₁ so that the stepping relay coil may be energized at any time desired by the operator to move on to the next current level to override the impulse control. A shunt circuit is also provided around the stepping relay coil including a condenser 23 in series with a resistor 24 to absorb the field and lastly a single condenser 26 is connected between the rectifier 20 and the power line 16.

For this portion of the circuit the operation is as follows: each time the spot welder is operated the relay coil CR–1 is energized to apply a pulse to the pulse counter M. This pulse counter may be said to operate at the end of any given series of impulses and in this particular instance may be adjusted to operate at anywhere from 8 to 480 impulses. When the proper number of impulses for which this counter has been adjusted have been applied it will then close its contacts M₁ and with the application of the next spot weld pulse to close contacts CR–1₂ the stepping relay coil H will be energized and the shaft will be turned to rotate both the series of arms H₁ and H₂. If it is desired to move on to a higher current before the number of impulses set, the operator may move the stepping relay by closing the manual switch 22 and causing the stepping relay to be actuated before the contacts M₁ are automatically closed by the impulse counting relay M.

The welding circuit includes a source of power for welding 27 connected to terminal 28. Welding electrodes 29 are connected between the power supply 27 and terminal 30. As described earlier there is incorporated in the welding circuit a certain amount of resistance which in this figure is indicated by the various resistors $R_1$, $R_2$, $R_3$, $R_4$, $R_5$, $R_6$, $R_7$, $R_8$, $R_9$. The total amount of resistances is designed to cut the current down to a given figure to start and then increase the current by steps until it is full value. Such an increase might be in the order of 22.5%. In order to incorporate these resistors in the circuit applying power to the welding electrodes, terminals 28 and 30 are cut into the circuit controlling current to the welding electrodes. If then the manual switch 33 is closed, full weld current will flow in the welding circuit which would then act as though this system had not been added but if switch 33 is open resistors $R_1$ through $R_9$ will be connected in the control circuit and welding current will flow in relation to as many of the resistors $R_1$ through $R_9$ as are incorporated at that time. The various resistors $R_1$ through $R_9$ are cut in and out of the circuit by movement of one of the arms, such as 31, 32 or 34, of the switch H₂. These switch arms are mounted on a common axis and are spaced at 120° apart so that only one arm contacts the various switch contacts while the other arms will not engage any conductive points and will be not in use.

Assuming that switch arm 31 is in the position shown in the figure in contact with stationary contact 36 then all of the extra resistance will be included in the welding circuit. A circular conductive slip ring 38 is also provided on the shaft of the switch H₂ to electrically connect to the arms 31, 32 and 34 and its surface is engaged by a wiping arm 40 conductively connected to contact 30. The series circuit which as before mentioned is cut into and employed in series with the welding circuit may be traced as follows: from contact 30 through wiping switch arm 40, slip ring 38, arm 31, stationary contact 36 through each of the resistances $R_1$ through $R_9$, thence through conductor 42 to stationary contact 44 and then through tie line 46 to contact 28. With the switch H₂ in this position the maximum number of resistance means will be in circuit and the welding current will be at its minimum value. As the stepping relay H is actuated, arm 31 will sequentially move clockwise to engage stationary contacts 48, 50, 52, et seq. with each energization and as arm 31 does so resistors $R_1$, $R_2$, $R_3$ et seq. are cut out and the welding current will rise in proportion to the amount of resistance removed from the circuit.

In order that the operator may have knowledge of the exact position of the stepping relay and know how much resistance there is in the circuit at any given moment the control system also includes a plurality of indicating lights. This circuit is shown near the center of the circuit diagram and is actuated by that portion of the stepping relay which includes rotating arm assembly H₁ commonly mounted on the same shaft with arm assembly H₂ and, therefore, rotates simultaneously therewith. This portion of the switch has the same number of arms 54, 56 and 58 which are phased to rotate with arms 31, 32, and 34 of arm assembly H₂. A second slip ring 60 is likewise supplied for this section and a wiping contact 62 engages the same which latter is directly connected to conductor 14, one side of the power supply line. Switch arm 54 would, therefore, engage stationary contact 64 in the position shown to complete a circuit through indicating light 66 to show that the largest amount of resistors were all included in the circuit by the position of the switch. As switch arm 54 progresses clockwise with the assembly H₁, H₂ it will sequentially engage stationary contacts 68, 70, 72, et seq. to sequentially light individually lights 74, 76 and 78 as the stepping relay moves around to the different positions cutting out resistance. Thus by a quick glance at the indicating board including these lights the operator can tell how far the stepping relay has progressed to cut out resistance and increase the total amount of welding current to the electrodes. A protective resistance 80 is connected in shunt to the last light 82 to prevent a short circuit on the line if anything happens to this light and prevent a dead short across power lines 14–16.

When the arms 30 and 54 have moved over the complete set of stationary contacts and have moved away from the last contact the next available switch arms 34–58 will move into contact with final stationary contacts 84 of switch section H₂ and 86 of switch section H₁. In this position all of the resistors $R_1$ through $R_9$ will be eliminated from the circuit but a complete welding circuit will be provided through arm 34 and at the same time arm 54 of switch section H₁ in engaging stationary contact 86 completes an energization circuit through a flasher unit 88 in series with one or more lights 90, 92 which may be placed at different locations to indicate that the stepping relay has phased out, completed its cycle and that the machine should be deenergized and the welding electrodes removed and new and properly shaped electrodes replaced before the work cycle can be repeated.

At the conclusion of the replacement of the welding electrodes with properly shaped ones the operator may again close the manual switch to start application of welding pulses to the impulse counting relay M and a complete recycling of the whole control circuit to first include all of the resistances $R_1$ through $R_9$ and then the sequential removal of the resistances in the manner described.

By the use of this system as the tapered end of each electrode begins to mushroom or flatten out with use through providing a predetermined number of spot welds the control system will increase the current through the total welding circuit to try to maintain approximately the same current per unit electrode area and, therefore, approximately the same amount of heat per weld so that the same weld nuggets will be produced.

What is claimed is:

1. In a spot welding machine having electrodes for clamping the work and applying electric power to parts to be welded,
   a welding circuit including a welding power supply for supplying power pulses to said electrodes;
   an auxiliary control circuit comprising, a source of electrical power, impulse counting means connected to the source of electrical power for counting the number of welds performed and operating at the end of a set number of welds, said means connected to said welding circuit and responsive to pulses therein, and stepping switching means having actuating means, a plurality of stationary contacts and a movable switch arm controlled by the actuating means to selectively engage the stationary contacts, the actuating means being connected to the source of electrical power and the impulse counting means to be actuated by the impulse counting means at the end of the set number of welds; and resistance means having a plurality of taps connected to the stationary contacts of the stepping switching means, the resistance means connected in series with the said electrodes and said welding power supply so that as the movable switch arm of the stepping switching means is operated to different positions, different amounts of resistance will be included in series with the welding circuit to control the welding current dependent upon the number of welds that have been made in a given sequence.

2. In a spot welding machine having electrodes for clamping the work and applying electric power to parts to be welded, a welding circuit including a welding power supply for supplying power pulses to said electrodes;

an auxiliary control circuit comprising, a source of electrical power, impulse counting means connected to the source of electrical power for counting the number of welds performed and operating at the end of a set number of welds, said means connected to said welding circuit and responsive to pulses therein, and stepping switching means having actuating means, the actuating means being connected to the source of electrical power and the impulse counting means to be actuated by the impulse counting means at the end of the set number of welds;

resistance means having a plurality of taps connected to the stepping switching means, the resistance means connected in series with the said electrodes and said welding power supply so that as the stepping switching means is operated to different positions, different amounts of resistance will be included in series with the welding circuit to control the welding current dependent upon the number of welds that have been made in a given sequence;

a second stepping switching means mechanically connected to the first stepping switching means and operating therewith, said second stepping switching means being connected to the source of electrical power, and a plurality of indicating means connected to the second stepping switching means and the source of electrical power to indicate to the operator the position of the stepping switching means and the amount of resistance in the welding circuit at any given instant.

3. In a spot welding machine having a source of power for welding and electrodes for clamping the work and applying electric power to parts to be welded and a main control circuit for supplying power to said electrodes in pulses, each pulse corresponding to a completed weld, the main control circuit including resistance means connected to the source of power for welding, the resistance means having a plurality of taps, multiple contact switching means connected to one welding electrode and to the taps of the resistance means for progressively varying the amount of resistance in the main control circuit as the switching means is moved; and an auxiliary control circuit comprising a second source of electrical power, actuating means for moving the switching means, the actuating means being connected to the said second source, and counting means connected to the main control circuit for sensing and counting welding pulses therein and connected to the second source of electrical power for energizing the actuating means after a set number of welds.

4. In a spot welding machine having a source of power for welding and electrodes for clamping the work and applying electric power to parts to be welded and a main control circuit for supplying power to said electrodes in pulses, each pulse corresponding to a completed weld, the main control circuit including resistance means connected to the source of power for welding, the resistance means having a plurality of taps, multiple contact switching means connected to one welding electrode and to the taps of the resistance means for progressively varying the amount of resistance in the main control circuit as the switching means is moved;

an auxiliary control circuit comprising a second source of electrical power, actuating means for moving the switching means, the actuating means being connected to the said second source, and counting means connected to the main control circuit for sensing and counting welding pulses therein and connected to the second source of electrical power for energizing the actuating means after a set number of welds; and a plurality of energizable indicating means, a second multiple contact switching means connected to said plurality of energizable indicating means and to the second source of electrical power to control the energization thereof, said second multiple contact switching means being mechanically coupled to the first-named multiple contact switching means and movable simultaneously therewith to indicate the position of the combined first and second switching means, and the amount of resistance of the main control circuit.

5. In a spot welding machine having a source of power for welding and electrodes for clamping the work and applying electric power to parts to be welded and a main control circuit for supplying power to said electrodes, a plurality of resistance means connected in series circuit relation with each other and the said source of power, multipole multiposition switching means connected between said resistance means and an electrode to switch varying amounts of resistance into the welding circuit; a second source of electrical power, switch actuating means connected to the second source of power and connected to the multiposition switching means, and further means connected to the actuating means and said second source of power and responsive to weld pulses in the main control circuit for energizing the switch actuating means after a series of welds have been performed, as indicated by the weld pulses, to thereby actuate said multiposition switching means after a series of weld pulses to a next position to cut out a given amount of resistance and increase the welding current in a total sequence of welds.

6. In a spot welding machine having a source of power for welding and having electrodes for clamping the work and applying electric power to parts to be welded and a main control circuit for supplying power to said electrodes, a plurality of resistance means connected in series circuit relation with each other and the said source of power, multipole multiposition switching means connected between said resistance means and an electrode to switch varying amounts of resistance into the welding circuit, a second source of electrical power, switching actuating means connected to the second source of power and connected to the multiposition switching means, further means connected to the actuating means and said second source of power and responsive to weld pulses in the main control circuit for energizing the switch actuating means after a series of welds have been performed as indicated by the weld pulses to thereby actuate said multiposition switching means after a series of weld pulses to a next position to cut out a given amount of resistance and increase the welding current in a total sequence of welds, a plurality of indicating means connected to said second source of power, and means for selectively energizing the indicating means comprising a second multipole multiposition switching means connected to said second source of electrical power and said plurality of indicating means and mechanically coupled to said first multipole multiposition switching means to move therewith to indicate the position thereof and the amount of resistance in the welding circuit.

References Cited

UNITED STATES PATENTS

| | | | |
|---|---|---|---|
| 1,252,144 | 1/1918 | Murray et al. | 219—108 |
| 2,243,833 | 6/1941 | Bohn | 219—108 |
| 2,401,780 | 6/1946 | Undy | 219—108 |
| 2,429,186 | 10/1947 | Johnson et al. | 219—111 |

RICHARD M. WOOD, *Primary Examiner.*

B. A. STEIN, *Assistant Examiner.*